May 17, 1966 — L. PALYI — 3,251,558
MILLING MACHINE
Filed Nov. 1, 1963 — 4 Sheets-Sheet 1
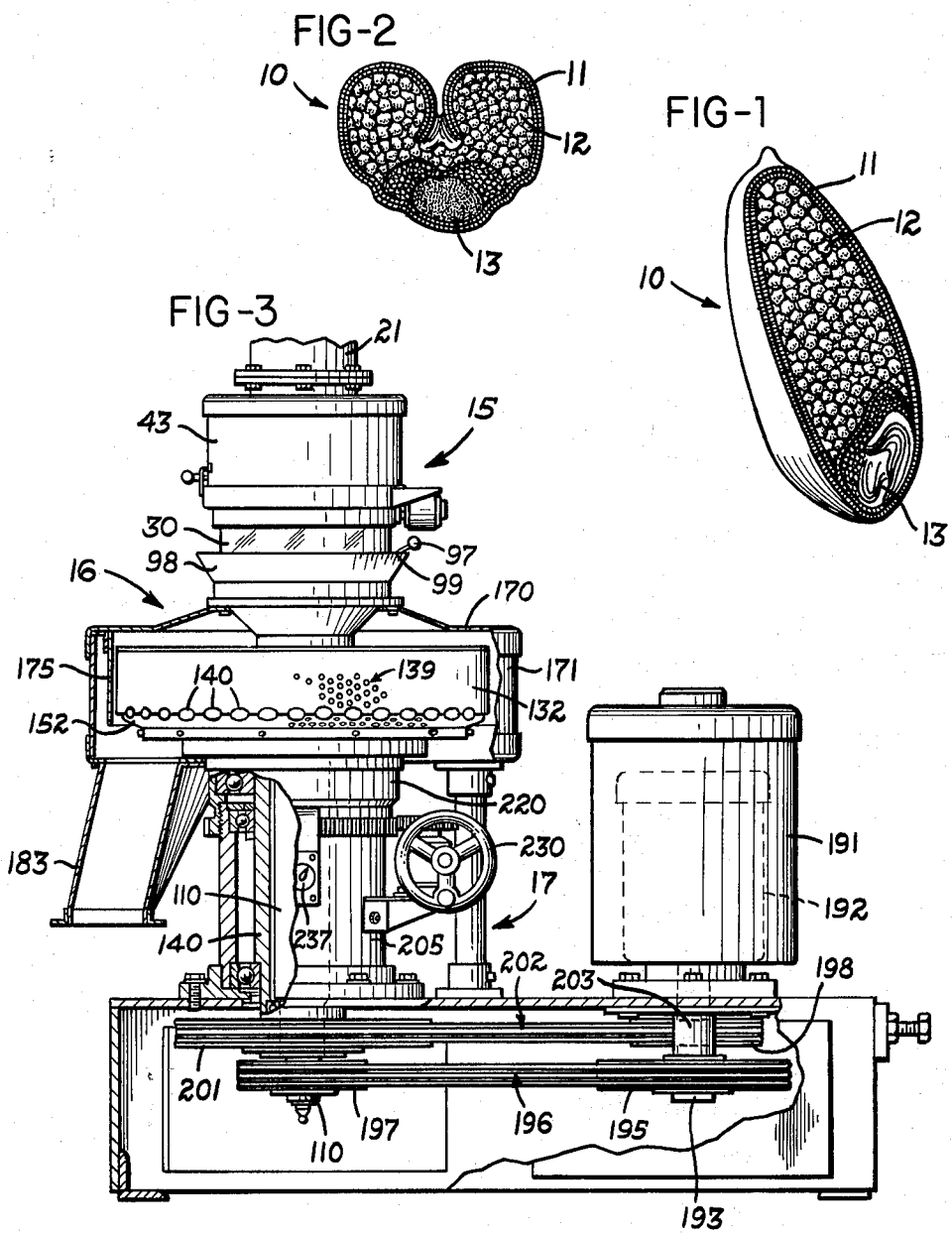
INVENTOR.
LESLIE PALYI
ATTORNEYS

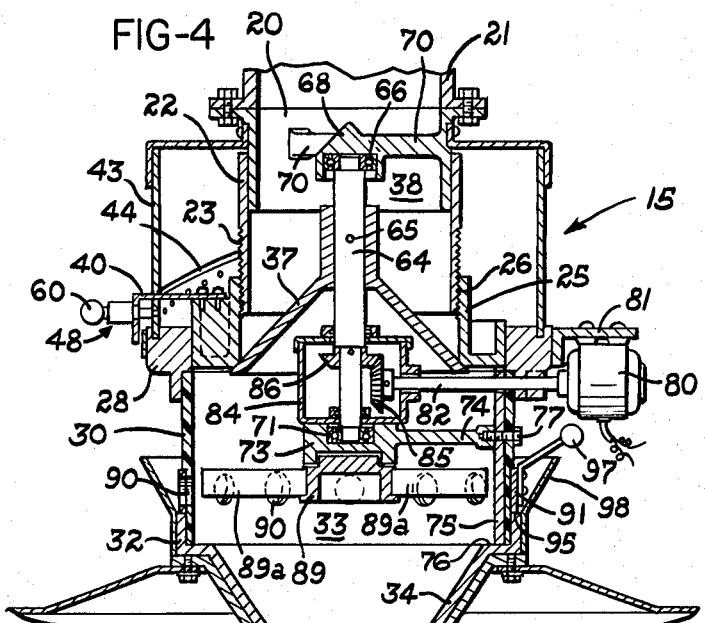

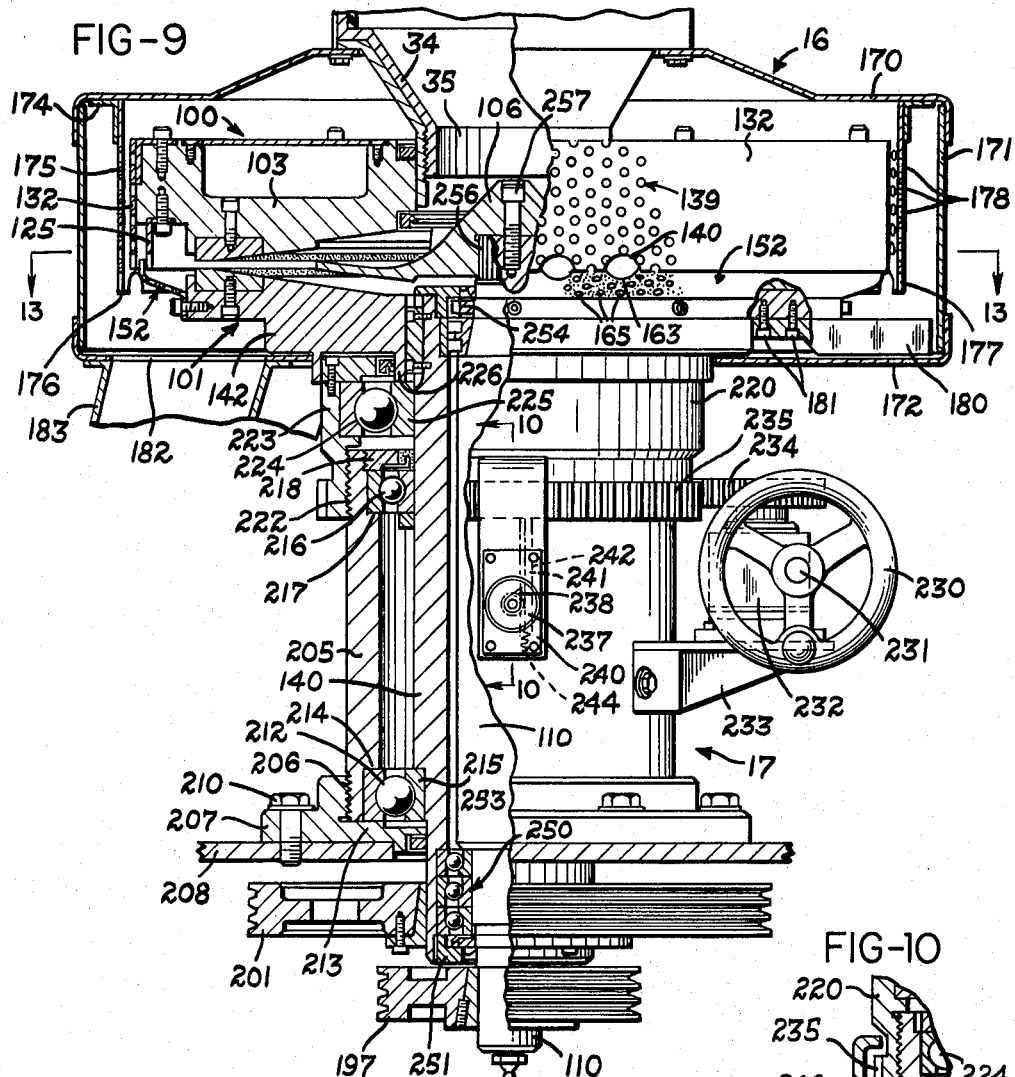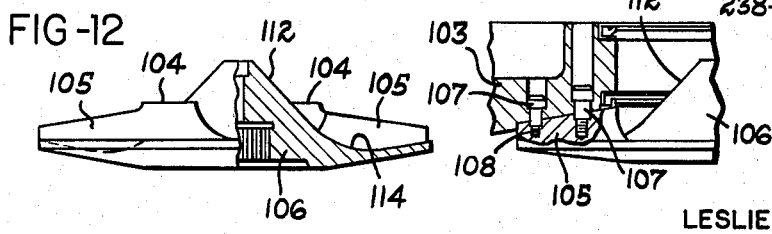

May 17, 1966 — L. PALYI — 3,251,558
MILLING MACHINE
Filed Nov. 1, 1963 — 4 Sheets-Sheet 4
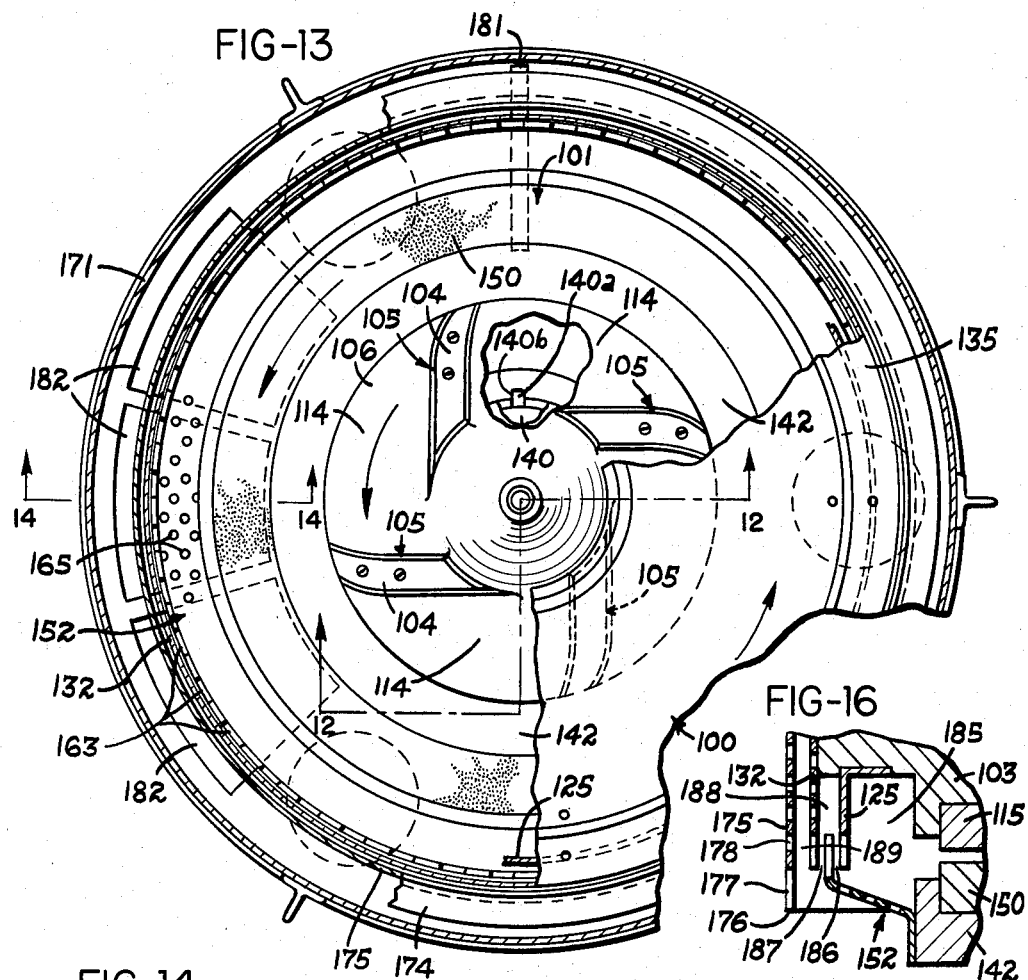
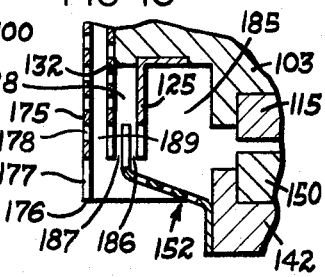
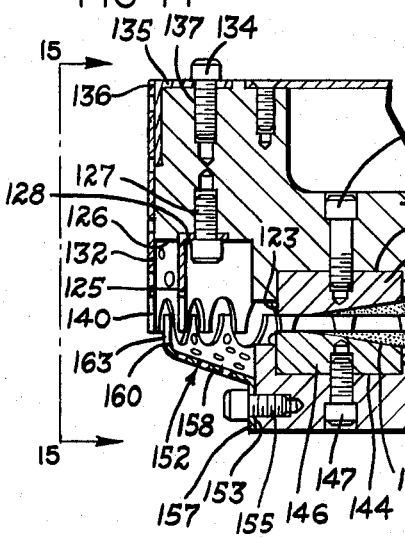
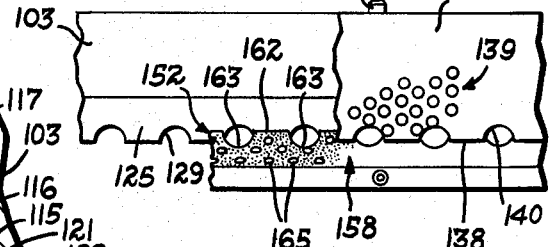
INVENTOR.
LESLIE PALYI
BY
Marechal, Biebel, French & Bugg
ATTORNEYS

United States Patent Office 3,251,558
Patented May 17, 1966

3,251,558
MILLING MACHINE
Leslie Palyi, Toronto, Ontario, Canada
(23 Larabee Crescent, Don Mills, Ontario, Canada)
Filed Nov. 1, 1963, Ser. No. 320,868
13 Claims. (Cl. 241—74)

This invention relates to an apparatus for producing granular wheat flour.

Flour is produced from the starchy endosperm which comprises about 83% of the wheat kernel by separating therefrom the bran and germ which comprise 15% and 2%, respectively, of the kernel (see Elements of Food Engineering, 1952, Reinhold Publishing Company, New York, N.Y.). In order to produce the highest grade of flour it is necessary to remove all of the bran and germ from the endosperm, and it is presently felt that only approximately 72% of the kernel or 80% of the endosperm can be commercially removed from the wheat kernels for use as pure flour.

Moreover, the grinding and compacting that occur in present milling processes, especially in the widely used roller mills, cause the wheat kernel to be tightly compacted so that it is difficult to separate the endosperm from the germ and bran thus decreasing the pure flour that is produced. The germ is also tightly compacted and crushed thereby causing the flour to adhere to the oils and the like which squeezed from the germ, with resulting discoloration and requiring additional refining steps in order to purify the finished product. The friction and compacting present in these mills could raise the temperature well above the 90° F. which melts the sugar present in the germ causing additional discoloration and contamination of the flour. The heating also reduces the frangibility of the kernel so that additional power is required to separate the various portions thereof, and in the end, the total percentage of flour separated from the bran and germ is reduced.

Accordingly, it is an object of this invention to provide a high speed apparatus for producing an improved granular flour and for recovering an increased percentage of the endosperm from the wheat kernel.

Another object of the invention is to provide an apparatus for producing high quality granular flour wherein the endosperm, germ, and bran of the wheat kernel are separated without crushing or severing of the germ thereby eliminating discoloration and contamination of the flour.

A further object of the invention is to provide an apparatus for separating the various portions of the wheat kernel and breaking the endosperm into small granules or multi-sided particles without any substantial increase in the temperature thereof thereby improving the quality and frangibility of the endosperm.

Another object of this invention is to provide an apparatus for separating the endosperm, bran, and germ of a wheat kernel by a slight amount of attrition to remove the bran and by subjecting the portion of the kernel to a high velocity rubbing, grading, and fluttering action in the presence of a large quantity of air so that there is a complete absence of cutting, compacting, and reduced heating of the kernel.

A still further object of this invention is to provide an apparatus for evenly mixing grain with precise quantity of air and for feeding this mixture at a uniform rate to separation apparatus, and particularly to provide feeding process and apparatus of the aforesaid type wherein the quantities of grain and air can be easily varied as desired.

Still another object of this invention is to provide a milling device wherein a pair of attrition disks are adapted to rotate at different relative speeds either in the same direction or in opposite directions, and further are provided with mechanism which permits the rotating disks to have the spacing therebetween varied within preset limits during operation of the mill.

A further object of this invention is to provide an apparatus which is dependable and flexible in operation and capable of being adjusted without terminating operation thereof.

The invention contemplates evenly and uniformly mixing present amounts of air and wheat kernels or wheat particles which have been through one or more prebreaking steps, and supplying the mixture to an impeller which forces the mixture between two attrition disks rotating at different relative speeds. These disks are spaced apart a distance slightly less than the diameter of the wheat kernels, so that as the velocity of the air and centrifugal forces of the disks force the kernels therebetween, the bran is stripped therefrom. The various components of the kernel are then subject to a high speed separating action which includes a rubbing, abrasive, grading and fluttering action resulting from a series of random eddy currents created between perforated intermeshed baffles which are rotating at different relative speeds. In doing so, no portion of the kernel is compacted, and the temperature thereof is not raised substantially so that the germ is not crushed or unduly heated to contaminate the flour. Moreover, the resulting product is a granular or multi-sided flour particle of increased quality and quantity than heretofore thought commercially practical.

Other objects and advantages of this invention will be apparent from the following description, the accompanying drawings and the appended claims.

In the drawings:

FIG. 1 is a perspective view partially in section of a wheat kernel;

FIG. 2 is a sectional view through the wheat kernel in a plane perpendicular to its longitudinal axis;

FIG. 3 is an elevation view of the flour mill with a portion thereof broken away to illustrate the internal components thereof;

FIG. 4 is a vertical sectional view through the feed mechanism;

FIG. 5 is an enlarged sectional view of the adjusting device for the feed mechanism;

FIG. 6 is an enlarged sectional view of a portion of the feed mechanism;

FIG. 7 is a plan view of the inlet to the feed mechanism;

FIG. 8 is an enlarged elevation view, shown partially in section, illustrating the air flow regulating mechanism;

FIG. 9 is an enlarged elevation view, partially in section, of the separating and drive mechanisms;

FIG. 10 is a sectional view taken along the line 10—10 of FIG. 9;

FIG. 11 is an enlarged sectional view of the connection between the impeller and the upper disk assembly;

FIG. 12 is a side view, partialy in section, of the impeller;

FIG. 13 is a horizontal section taken along the line 13—13 of FIG. 9;

FIG. 14 is an enlarged sectional view taken along the line 14—14 of FIG. 13;

FIG. 15 is an enlarged side view taken along the view line 15—15 of FIG. 14; and FIG. 16 is an enlarged schematic view illustrating the operation of the separation mechanism.

Referring now to the drawings wherein a preferred embodiment of the invention is shown, FIGS. 1 and 2 illustrate a kernel of wheat 10 including hard, indigestible, cellulose outer shell or bran 11 which surrounds and protects the starchy endosperm 12 and the germ 13. The latter is rich in fat and protein, and therefore, the entire germ must be removed to produce a flour which can be satisfactorily stored and used for baking. As indicated above, the hereinafter described process and apparatus separate these three portions of the wheat kernel in such a manner that the flour particles are multi-sided granules and without any substantial contamination of the flour by the germ. FIG. 3 shows generally the milling apparatus, which can be divided into the following components for purposes of description: the feed mechanism 15, the separating mechanism 16, and the drive and adjusting mechanism 17.

Feed mechanism

The feed mechanism 15 automatically and uniformly mixes the wheat kernels with a predetermined volume of air and then suplies this mixture at a uniform rate to the separating mechanism 16. Thus, as seen in FIG. 4, the feed mechanism 15 includes an inlet housing member 20 which is suitably secured to a duct 21 through which the wheat is supplied. Secured rigidly to the member 20 is a tubular sleeve 22, which extends downwardly therefrom and has the external threads 23 on the lower end thereof. The annular regulating ring 25 has similar internal threads 26 thereon which engage the threads 23 so that when the ring is rotated it moves vertically with respect to the sleeve 20 between predetermined limits.

The regulating ring 25 is surrounded by an annular housing member 28 supported on the upper end of the tubular transparent housing member 30 which in turn is mounted on the lower housing member 32. The member 32 channels the air-wheat mixture from the mixing chamber 33 above the larger end thereof, along the tapered shoulder 34, and into the smaller inlet chamber 35, and this housing member 32 is threadedly secured to the complementary inlet housing 35 of the separating mechanism 16.

The annular regulating ring 25 and the control cone 37 cooperate to regulate the flow of wheat from the supply chamber 38 into the mixing chamber 33, and the regulating ring is moved vertically with respect to the cone 37 by merely rotating this ring to cause the threaded connection with the sleeve 23 to effect relative vertical movement thereof. Rotation of the ring 25 is effected by the L-shaped arm 40 which is secured by the screws 41 to the ring 25 and which extends outwardly of the housing cover 43 through the tapered slot 44, as shown in FIGS. 4 and 5.

The downwardly extending flange 46 of the arm 40 has mounted thereon a detent 48 for locking the arm 40 and the ring 25 in any one of a plurality of positions. The detent includes a tubular housing 51 rigidly secured in an aperture 52 in the flange 46, and has therein a reciprocating shaft 53 which is biased toward the right, as shown in FIG. 5, by the conventional coil spring 54 interposed between the left end of the housing and the enlarged shoulder portion 55 on the shaft 53.

The shoulder portion 55 has a tapered pin 57 on the right end thereof which is complementary in size to the apertures 58 spaced evenly along the slot 44 so that the arm may be locked in place at substantially any position along the slot. Thus by withdrawing the pin 57 by use of the handle 60, the arm 40 may be rotated causing it to rotate the ring 25 with respect to the sleeve 23 thereby appropriately changing the size of the feed opening 61 between the edge 62 (FIG. 6) of the ring 25 and the control cone 37. The slot 44 through which the arm 40 moves is tapered upwardly to accommodate the vertical movement thereof of the arm 40.

The control cone 37 is rigidly secured to a vertical support shaft 64 by a pin 65, and the upper end of this shaft is supported for rotation by the ball bearing 66 which is in turn secured in the central support 68 positioned internally of the chamber 38 by the three equally spaced arms 70 which are integrally secured to the housing member 20 (FIG. 7). The lower end of the shaft 64 is similarly supported in a ball bearing 71 which is held centrally in the mixing chamber 33 by a support 73 and the associated three equally spaced radial arms 74. The arms 74 are not supported directly on the transparent plastic sleeve 30, but rather are supported on the ribs 75 which extend from the shoulder 76 on the housing member 32 upwardly in an axial direction, and the suitable screws 77 are used to secure the transparent sleeve 30, the ribs 75, and the arms 74 together, as shown in FIG. 4. While only one arm 74 and rib 75 are shown, it should be clear that there are three equally spaced around the support 73.

The support shaft 64 and the control cone 37 are rotated by a slow-speed drive motor 80 which is supported by a bracket 81 on the housing member 28, and its drive shaft 82 extends through the sleeve 30 into the gear box 84 supported within the chamber 33 by the support 73 and its associated arms 74. The drive shaft 82 has a beveled gear 85 secured on the end thereof which meshes with a similar gear 86 on the support shaft 64 so that rotation of the drive shaft causes rotation of the cone 37. The cone 37 has a plurality of ribs 87 (FIGS. 6 and 7) on the outer surface 88 thereof to insure a slight engagement with the wheat kernels, and the motor rotates at relatively slow speed since only a slight amount of rotation of the cone 37 is required in order to insure even flow of wheat into the chamber 33.

A permanent magnet 89 is mounted on the bottom of gear box 84, and has a plurality of arms 89a which extend almost to the inner surfaces of the housing member 30 so that any scrap metal particles in the wheat will be picked up as the wheat flows therepast.

The air flows into the chamber 33 through the openings 90 in the transparent housing member 30, and the control ring 91 is utilized to vary the rate of this air flow. In particular, as shown in FIG. 8, the transparent member 30 has a relieved annular portion 93 on the exterior of the lower portion thereof which creates a shoulder 94, and the control ring 91 is secured between this shoulder and the upper edge 95 of the lower housing member 32. The control ring 91 has openings 96 therein which are substantially identical and complementary in size and spacing to those in the member 30, so that when the openings 90 and 96 are aligned, the control ring 91 offers no resistance to air flow through these openings.

However, the control ring can be rotated by the handle 97 which is secured thereto, as shown in FIG. 4, so that the air flow may be reduced and completely shut off as desired, by moving the ring 91 to misalign the openings 90 and 96. An annular shield 98 is secured to the exterior of the lower housing member 32 and extends upwardly and outwardly opposite the ring 91 for protecting the ring and preventing the openings 90 and 96 from becoming clogged by foreign objects. The upper edge 99 of this shield may be calibrated, as shown in FIG. 3, so that the amount of air flow is readily indicated by the position of the handle 97. It should be appreciated, however, that other types of shields or protection devices might be used, and that such a shield might be completely eliminated.

Separation mechanism

The separation mechanism 16 includes the upper and lower disk assemblies 100 and 101 which are mounted for rotation at different relative speeds in either the same or opposite directions. The upper assembly 100 includes a disk 103 secured on the upper surface 104 of the four blades 105 of the impeller 106 (FIGS. 11 and 12) by the screws 107 which extend through the disk 103 and into suitably threaded bores 108 in the impeller. As will be explained in detail, the impeller 106 is mounted on the inner drive shaft 110 which rotates upper drive assembly 100 including the impeller 106 at high speed.

The impeller 106 has a cone-shaped center portion 112 for changing the direction of flow of air and wheat from an axial intake to a generally radial direction into the path of the impeller blades 105 which impart radial and angular forces to the grain-air mixture so that it is thrown from the impeller 106 along a spiraling path as viewed in FIG. 13. The surface 114 of the impeller 106 intermediate the blades 105 are smooth so that the wheat kernels slide easily therealong without any substantial restriction or clogging. While a particular configuration of impeller is shown, it is possible to use other designs thereof so long as they substantially fulfill the hereinafter described functional requirements.

An annular attrition ring 115 is secured in the undercut surface 116 of the upper disk 103 by the screws 117 as shown in FIG. 14. The working surface 120 of this ring is slightly tapered from the inner to the outer diameter thereof and the innermost edge 121 thereof is flush with the adjacent surface 122 of the disk 103 thus insuring that the wheat kernels will flow smoothly onto the ring. A shoulder 123 is formed at the outer periphery of the ring so that the various particles of the kernels pass freely from the ring.

The inner sheet metal baffle 125 is secured adjacent the horizontal surface 126 adjacent the outer periphery of the disk 103, and the baffle is spaced at a predetermined distance from the outer periphery of the annular ring 115. The screws 127 extend through the inner flange 128 on the baffle 125 and into the disk 103 to thus support the baffle in position surrounding the ring 115, and this baffle is provided with evenly spaced U-shaped cutouts 129 in the lower peripheral edge thereof for purposes to be described.

The outer baffle 132 is similarly secured to the outer periphery of the upper disk 103 spaced a predetermined distance from the inner baffle 125 by the screws 134 which extend through the inner flange 135 integrally secured on the upper edge portion 136 of the baffle 132 and into the suitably tapped bores 137 in the disk 103. The outer baffle 132 extends downwardly to the same level as the lower edge 130 of the inner baffle, and the lower edge 138 thereof also has therein cutouts 140 which are substantially identical to those in the inner baffle. In addition, the portion of the baffle 132 extending below the surface 126 of the disk 103 is perforated with evenly spaced openings 139 which form a substantial portion of the surface area thereof.

The lower disk assembly 101 is carried for rotation on the outer drive shaft 140 so that the upper and lower disks 103 and 142 cooperate to remove the bran from outer surface of the wheat kernels. The top surface 143 of the lower disk 142 is thus complementary in configuration to the adjacent surface of upper disk, and includes a recessed portion 144 into which the annular attrition ring 146 is secured by the screws 147 (FIG. 14). Likewise, the inner edge 148 of the ring 146 is flush with the adjacent portion of the surface 143, and the active surface 150 thereof tapers upwardly and the outer edge thereof drops off sharply. As seen in FIG. 14, the inner and outer diameter of the attrition rings 115 and 146 are substantially identical so that they act in unison, and both these rings are made of very hard, long wearing abrasive material such as steel, and have a plurality of closely spaced grooves in the surfaces 120 and 150 thereof.

An annular intermediate baffle 152 is secured to the outer peripheral wall 153 of the disk 142 by the screws 155 which extend through the flange 157 thereof and into the lower disk 142. The baffle 152 has a deflector portion 158 which extends gradually upwardly from the flange 157 to a point below the inner and outer baffles 125 and 132, and the vertical portion 160 thereof extends upwardly between the baffles 125 and 132 a predetermined distance. The upper edge 162 of the baffle 152 has the cutouts 163 formed therein which are the same size and spacing as the cutouts 129 and 140 in the baffles 125 and 132, and the deflector and vertical portions 158 and 160 of the baffle 152 are perforated with opening 165 similarly to those in the outer baffle 132. The outer surface of the deflector and vertical portions 158 and 160 are coated with crushed Carboloy which is silver soldered thereon to present a long wearing abrasive surface whose function will be described in connection with the operation of the separation mechanism. It is also possible to vertically corrugate the vertical portion 160 to increase the abrasive effect thereof.

The sheet metal housing encloses both of the disk assemblies 100 and 101, and includes upper, side, and lower walls 170, 171, and 172. The bracket 174 on the upper wall 170 supports a stationary baffle 175 which is secured rigidly thereto, and this baffle 175 is spaced from the outer baffle 132 a predetermined close distance and extends downwardly beyond the lower edge 138 of the baffle 132. The lower edge 176 thereof also has the semi-circular cutouts 177 and perforations 178 therein similar to the outer baffles 132. The lower disk 142 has a sweeper bar 180 secured thereto by the screws 181, and this bar passes just above the upper surface of the bottom wall 172 so that, when the wheat particles collect on this surface, they are swept into the discharge duct 183 secured in communication with an opening 182 in the bottom wall 172, and thus removed from the apparatus.

The inner and intermediate baffles 125 and 152 and the outer periphery of the disks 103 and 142 cooperate to form a separation chamber 185. The material in the chamber 185 passes through the annular passageways 186 and 187 defined between the inner and intermediate baffles 125 and 152 and intermediate and outer baffles 152 and 132, respectively, with the space above the upper edge of the intermediate baffle 152 and between inner and outer baffles 125 and 152 defining a transition chamber 188. Another passage 189 is defined between the outer and stationary baffles 132 and 175, and the purpose of these passageways is explained fully hereinafter.

*Drive and disk adjusting mechanism*

The drive and disk adjusting mechanism shown in FIGS. 3 and 9 includes a pair of variable speed electric motors 191 and 192 which are provided with suitable controls, not shown. The larger of these motors 191 drives the upper disk assembly 100 and is connected thereto through the drive shaft 193, the belt pulleys 195 secured on the shaft 193, a plurality of conventional belts 196, and the drive pulleys 197 secured on the lower end of the inner drive shaft 110. The smaller motor 192 drives the lower disk assembly 101 and is similarly connected thereto through the pulleys 198 and 201 which are interconnected by the conventional belts 202 and which are connected to the motor drive shaft 203 and the outer drive shaft 140, respectively, which surrounds the inner drive shaft 110.

As shown in FIG. 9, the outer drive shaft 140 is supported on the housing and in turn supports the inner drive shaft 110 and these shafts may rotate with respect to each other and to the stationary housing. Specifically, the tubular housing member 205 is secured by a threaded connection 206 to the annular mounting flange 207 which is secured to the horizontal housing plate 208 by the conventional machine screws 210. The ball bearing 212 is clamped between the inner shoulder 213 on the flange 207 and the shoulder 214 formed in the housing member 205, and supports the lower end of the outer shaft 140 since the inner race 215 thereof is press-fitted onto the shaft 140. The upper portion of the outer shaft 140 is similarly supported by the ball bearing 216 which is clamped against the shoulder 217 in the housing member 205 by the annular retainer 218 which is threadedly received in the upper end thereof.

The lower disk assembly 101 is mounted on the upper end of the outer shaft 140 and these components are locked together against relative rotation, but the disk assembly 101 can move vertically on the drive shaft 140 so that the distance between the disk assemblies 100 and 101 can be varied. Thus the upper end of the shaft 140 has exterior splines 140a (FIG 13) thereon which are engaged by complementary internal splines 140b on the lower disk 142 so that the latter will slide vertically on the shaft. Vertical movement of the disk 142 is effected by rotating the upper housing 220 which has a threaded connection 222 with the upper end of the housing member 205, as seen in FIG. 9. Thus rotation of the upper housing 220 effects vertical movement thereof which in turn is transmitted to the lower disk 142 through the outer race 223 of the ball bearing 224 and the inner race 225 thereof in contact with the downwardly extending shoulder 226 on the lower disk 142. By rotating the upper housing 220, the lower disk can be moved upwardly with respect to the upper disk assembly 100, and by rotating it in the opposite direction the disk 142 is similarly lowered.

Rotation of this upper housing 220 is manually controlled by a hand wheel 230 connected to shaft 231 which extends into the gear box 232 secured on the housing member 205 by the bracket 233. The output of this gear box includes a driving gear 234 which engages the appriately pitched annular rack 235 on the lower exterior edge of the upper housing 220, so that by rotating the hand wheel 230 the upper housing 220 is similarly rotated causing vertical movement of the lower disk assembly 101. This adjustment can be effected during the high speed rotation of the upper and lower disk assemblies 100 and 101 thus providing the capability of varying the distance d without shutting down the operation of the motors 191 and 192.

The exact position of the lower disk assembly 101 is indicated on the calibrated dial 237 (FIGS. 9 and 10) by a pointer 238 whose position is regulated by the reciprocating rack 241 which rides in a groove 242 of the indicating device 240 and is biased against the housing 220 by the spring 244. The rack 241 engages the pinion 245 so that vertical movement of the rack effects rotation of the pointer 238. As shown in FIGS. 9 and 10, the device 240 is secured to the housing member 205 so that vertical relative movement between the housing members 205 and 220 is indicated by the pointer 238.

The inner drive shaft 110 for the upper disk assembly 100 is supported for rotation within the outer drive shaft 140 by the thrust bearings 250 interposed between the retainer 251 threadedly connected to the outer shaft and the shoulder 253 formed on the inner shaft 110. Another conventional bearing arrangement 254 is provided between the shafts 110 and 140 at the upper end thereof so that the inner shaft is supported in the outer shaft for relative movement therebetween. The inner shaft has a splined connection 256 with the impeller 106 and secured thereto by the screw 257 (FIG. 9).

Operation

The feed mechanism receives a supply of wheat kernels or prebroken particles through the inlet duct 21 secured to the upper portion thereof, and these kernels or particles are usually gravity fed so that the entire chamber 38 is completely full at all times with wheat. The desired adjustment of the feed opening 61 is accomplished by rotating the ring 25 by use of the handle 60. The wheat kernels or particles pass smoothly through the opening 61 downwardly onto the slanted shoulder 61, and the rotation of the control cone 37 having the ribs 87 on its outer surface insures that this flow of wheat will be continuous, uniform, and clog-free, as might otherwise occur especially when the opening 61 is relatively small. As the wheat passes the air openings 90, it is thoroughly mixed with the inrushing air and both the air and grain mixture are deflected inwardly by the shoulders 34 so that a substantially uniform and evenly mixed air-wheat mixture falls onto the impeller.

In addition, the usual tramp or scrap metals which are present in the wheat supply, must pass by the outwardly extending arms 89a of the permanent magnet 89 so that they will be attracted thereto and separated from the wheat. The magnet 89 is clearly visible through the transparent housing member 30, so that when a substantial amount of tramp material builds up thereon, the machine can be shut down and the scrap metal removed.

The air-wheat mixture is drawn through the inlet chamber 35 due to the reduced pressure created by the high speed rotation of the impeller 106 and the centrifugal force of the disk assemblies 100 and 101. This mixture is uniformly dispersed over the exposed surface of the impeller, and the cone 112 causes the mixture to be turned approximately ninety degrees in a radially outward direction, so that impellers 105 impart additional radial force thereto to throw the wheat at high speed between the attrition rings 115 and 146, and as a result there is no tendency for the wheat kernels to accumulate in this area. The centrifugal force also tends to orient each of the kernels so that the heavier germ end leads the outward movement of the kernels so that the longitudinal axis tends to move outwardly between the disk assemblies 100 and 101 in horizontal plane and in a radial direction and thus each kernel will tend to be broken apart in the same manner as the others.

The operating surfaces 120 and 150 of the rings 115 and 146 are spaced apart a distance slightly less than the smallest dimension of the wheat kernel so that the bran will be stripped from the kernel without any substantial compacting or heating thereof. The disk assemblies 100 and 101 are rotating at different relative speeds either in the same direction or in opposite direction depending on the type of wheat, whether it is a first or subsequent break, and the type of flour being produced.

As the kernels pass at high speed radially between the abrasive rings 115 and 146 moving at different speeds, the brand 11 is substantially stripped from the endosperm 12 which also is broken into smaller particles. Since no compaction occurs during this operation, the germ 13 is not severed or split and the oils and semi-liquids therein are not permitted to contaminate the endosperm or flour. Moreover, the large volume of air which simultaneously passes between the rotating rings reduces and dissipates the heat generated by friction during this step.

The apparatus is flexible in operation so that the speeds of each of the disk assemblies 100 and 101 and the vertical spacing therebetween can be varied as desired during operation thereof thus permitting the mill to be adjusted properly during operation to achieve the desired milling action as dictated by the type, quality, moisture content, and other characteristics of the wheat and flour being produced. Moreover, these features permit the type and quality of wheat being processed to be changed without shutting down the mill.

The small particles of the wheat kernels are thrown outwardly in a spiraling direction from the rings 115 and 146 at high speed, as is the substantial quantity of air which accompanies the kernels. The subsequent operation is a rubbing and abrading action separating the endosperm 12 from the germ 13 and bran 12 to form granular flour particles without any compaction or heating of the germ.

The treatment of the wheat particles by the intermeshed baffles 125, 132, 152 and 175 is thought to be a combination of rubbing, abrading, fluffing, and impacting which results in high quality granular flour. For purposes of explanation, the theoretical interaction of these baffles is described in terms of individual steps but it should be understood that all the hereinafter described functions occur simultaneously and at high speed. Thus, as some of the heavier bran particles and the germ pass from the rings 115 and 146 they drop downwardly onto the top surface of the deflector portion 158 of the intermediate baffle 152 which is moving at high speed relative to such particles and there is a rubbing action during the contact therebetween and as the particle is quickly accelerated thereby creating additional separation of the floor particles. Some of the smaller and heavier bran particles may pass through the openings 165 but the majority thereof are deflected upwardly in the separation chamber 185 which has irregular eddy currents of air swirling therein which cause rubbing and abrading between the various particles of the kernels for further separation of the flour particles from each other and from the bran and germ.

The lighter particles of flour and bran pass from the rings 115 and 146 and into the chamber 185 with the rubbing and abrading action described above, and then they flow in swirling irregular eddy currents upwardly through the passageway 186 formed between the inner and intermediate baffles 125 and 152. These eddy currents continuously throw the particles against the inner baffle 125 and then against the intermediate baffle 152 which are moving at different relative speeds so that the particles are first accelerated and decelerated as they are moved between contact with the baffles. As a particle comes into contact with the baffle 152 there is a scraping and grating action as it drags along the surface over the openings 165 so that the flour particles are further separated from the bran and germ, as well as reduced in size.

These particles continue to move with the irregular eddy currents into the chamber 188 between the inner and outer baffles 125 and 132, and then with similar eddy currents downwardly through the passageway 117 between the surfaces of the intermediate and outer baffles 152 and 132 which are rotating at different relative speeds to accomplish the rubbing, grating, and abrading action as the particles are alternately forced into contact with the baffles and the edge of the openings 128 and 139 similar to the action discussed above to further separate and reduce the flour particles. At the same time, the high velocity air may carry the smaller lightweight flour particles through the openings 139 and are further reduced in size as they enter the tubular chamber 189 between the outer and stationary baffles 132 and 175 and where again there is a contact with the surfaces which are rotating in opposite direction. The Carboloy coating and corrugations on the outside of the intermediate baffle 152 adds to the separation of the wheat particles due to the additional rubbing and abrasion which is imparted to the particles.

The cutouts 129, 140, 163, and 177 in the baffles add to the breaking up of the flour particles as well as the creation of the eddy currents which function is described above. The cutouts are semi-circular so that no sharp cutting blows are imparted to the wheat particles so that there is no splitting or severing of the germ as it passes through the passageways 186 and 187. After the wheat particles pass through the baffles, they fall onto the wall 172 and are swept into the discharge duct 183 by the sweeper bar 180 on the lower surface of the disk 142. However, much of the separated wheat particles are carried into the duct 183 with the high air which passes through the baffles therewith. The germ, bran, and separated endo-sperm particles are thus remixed but can easily be separated without difficulty since they have been separated from one another.

The machine is capable of very high production due to the large amount of air which accompanies the wheat particles through the separation mechanism. The air is drawn through the separation mechanism by the impeller 106 and the centrifugal action created by the high speed rotation of the disk assemblies 100 and 101. The air in effect acts as a carrier for the wheat particles, and the smaller particles are blown through the openings and cutouts in each of the baffles so that the back pressure created by the baffles is not restrictive. It should however be appreciated that the precise functioning of the separation mechanism is a complex combination of each of the above described operations and results in flour granules of uniform size and shape.

While the inventive apparatus and process have been primarily described in connection with production of flour of a whole wheat kernel, it is contemplated that the process and apparatus can be used to refine and further separate wheat particles which have been broken apart by the use of roller mills, and in doing so a substantial portion of the subsequent screening or refining operations can be eliminated. When smaller particles are being treated by the apparatus, the attrition rings 115 and 146 are easily adjusted to decrease the space therebetween, and depending on the characteristics of the wheat and flour being produced, it is possible to alter the speeds of the disk assemblies 100 and 101. In effect therefore, the terms wheat kernels and wheat particles as used herein are equivalent and interchangeable.

The separation mechanism 16 may perform a prebreaking operation or one of several subsequent breaks, and a series of the mills can be used together to achieve the desired flour characteristics. When using the mechanism for a prebreaking operation, it may be desirable to lock one of the disk assemblies 100 or 101 against rotation to achieve the desired separation of the wheat kernels. Such locking may also be provided when subsequent breaks are being performed if it is necessary to obtain the desired breaking action.

One embodiment of the invention has disk assemblies which are capable of rotation up to 5,000 r.p.m. for the upper assembly and 3,600 for the lower assembly so that the maximum relative rotation may be 8,600 r.p.m. As a practical example of one embodiment of the invention, it is found that by using disks 103 and 142 which have outer diameters approximately 23" and cutouts which are $3/4$" in diameter and perforations which are $3/16$" in diameter and cover approximately 37% of the exposed surfaces of the baffles, it is found that flour of a superior quality is produced thereby. Such apparatus produces flour at a rate of 2,800 pounds per hour, and achieves a higher percentage of flour extraction from the wheat. When this apparatus is utilized for the grinding of the second midds after an initial break by a conventional roller mill, it is found that the rate of production and extraction is increased substantially, and that multiple cornered granules which sift more easily are obtained. A further advantage of this granule is the higher water absorption ability of the flour thereby resulting in economies in the baking processes.

Thus the invention has provided an improved apparatus for producing high quality flour at a substantial increase in rate in comparison with the heretofore known equipment. The invention separates the endosperm more efficiently from the wheat kernel and breaks it apart in such a manner that flour granules rather than flakes are obtained, and the germ is not heated or severed, thus increasing the quality of the resulting flour.

The flour which is produced by the milling mechanism is multi-sided and therefore absorbs liquid at a much faster rate than the heretofore flake flour produced by roller mills. Moreover, the granular flour is uniform in size and shape, and pours similar to salt and sugar, and as is known, the granular flour produces bakery products which are of improved quality and consistency. The uniformity and quality of the flour is of course the highest when the flour is exclusively produced by use of the herein described apparatus, including the pre-break and subsequent breaks, although flour of improved granular form is produced by using the apparatus for the initial or any subsequent break.

While the apparatus described herein constitutes the preferred embodiment of the invention it is to be understood that the invention is not limited to this precise form of apparatus, and that changes may be made therein without departing from the scope of the invention which is defined in the appended claims.

What is claimed is:

1. Flour milling apparatus for producing granular flour from wheat comprising, a feed mechanism for mixing the wheat with a predetermined amount of air, a separator mechanism including a first disk mounted for rotation about a first axis, a second disk mounted for cooperation with and spaced from said first disk a predetermined distance, said disks having an abrasive surface on adjacent sides thereof near the outer peripheries thereof, said surfaces being spaced apart a predetermined distance less than the thickness of the wheat kernels, means for rotating said disks at different relative velocities so that said air is pumped by centrifugal force through said separator mechanism carrying the wheat therewith and so that the bran is stripped cleanly from the wheat kernels as the kernels are forced between said surfaces, said separating mechanism including a plurality of cooperating annular baffle means on the outer periphery of said disks for rotation therewith to create a complex of irregular eddy currents which force the wheat particles against said baffle means causing separation of the endosperm into granular particles without any substantial heating or compaction thereof.

2. A flour mill of the character described for producing granular flour from wheat particles comprising, a feed mechanism including a housing having an inlet and an outlet, a control cone mounted in said housing and having one end which is larger than said outlet, said one end and the portion of said housing adjacent said inlet defining a variable outlet opening, means for effecting relative axial movement between said housing and said control cone to vary the size of said outlet opening, separator means in communication with said outlet, air control means in said housing between said control cone and said separator means for mixing a predetermined amount of air with the wheat particles flowing from said outlet opening, said separator means adapted to remove the bran from the wheat particles and including inner and outer annular baffles mounted for movement at high speed, an intermediate annular baffle mounted for movement with respect to said inner and outer baffles, a stationary baffle on said housing means aligned with said other baffles, each of said baffles having a plurality of cutouts in the edges thereof, said intermediate, outer, and stationary baffles having a plurality of small openings throughout the surfaces thereof, said baffles cooperating to create a complex of irregular eddy currents therebetween which force the wheat particles alternately against said baffles causing separation of the endosperm into granular particles without any substantial heating or compaction thereof.

3. A flour mill of the character described for producing granular flour from wheat comprising, a feed mechanism including a housing having an inlet and outlet, a control member mounted in said housing and having one end which cooperates with said outlet, said one end and the portion of said housing adjacent said inlet defining a variable outlet opening, means for effecting relative axial movement between said housing and said control member to vary the size of said outlet opening, separator means in communication with said outlet and adapted to remove the bran from the wheat kernels, said separator means including inner and outer annular baffles mounted for movement at high speed, an intermediate annular baffle mounted for movement with respect to said inner and outer baffles, a stationary baffle on said housing means aligned with said other baffles, each of said baffles having a plurality of cutouts in the edges thereof, said intermediate, outer, and stationary baffles having a plurality of small openings throughout the surfaces thereof, said baffles cooperating to create a complex of irregular eddy currents therebetween which alternately force the wheat particles between said baffles causing separation of the endosperm into granular particles without any substantial heating or compaction thereof.

4. A flour mill of the character described for producing flour from wheat comprising, a feed mechanism including a housing having an inlet and an outlet, a control member mounted in said housing and having one end which is larger than said outlet, said one end and the portion of said housing adjacent said inlet defining a variable outlet opening, means for effecting relative axial movement between said housing and said control member to vary the size of the said outlet opening, separator means in communication with said outlet, air control means in said housing between said control member and said separator means for mixing a predetermined amount of air with the wheat flowing from said outlet opening, said separator means adapted to remove the bran from the wheat kernels and includes a plurality of radial spaced and aligned annular baffles mounted for movement at different relative speeds, each of said baffles having a plurality of cutouts in the edges thereof to create a complex of irregular eddy currents therebetween which force the wheat between said baffles causing separation of the endosperm into granular particles without any substantial heating or compaction thereof.

5. Flour milling apparatus comprising, a housing, feed and separator mechanisms in said housing, a mixing chamber in said feed mechanism having an inlet and an outlet, variable means for regulating a rate of flow of wheat and air into said chamber, said separating mechanism including a first disk mounted for rotation, means defining an opening in said first disk in communication with said chamber outlet, an impeller disposed in said opening for receiving the mixture from said chamber outlet through said opening, a second disk mounted coaxially with said first disk and spaced from said first disk a predetermined distance, said disks having an abrasive surface on adjacent sides thereof near the outer peripheries thereof, said surfaces being spaced apart a predetermined distance less than the thickness of the wheat kernels, means for rotating said disks at different velocities so that when the wheat kernels are forced between said surfaces by said impeller and by the centrifugal force acting on the particles the bran is stripped cleanly from the wheat kernels, said separating mechanism including inner and outer annular baffles on the outer periphery of said first disk for rotation therewith, said inner and outer baffles being spaced axially beyond said surface of said first disk, an intermediate annular baffle on the other of said disk and extending between the inner and outer baffles, a stationary annular baffle on said housing concentric with said other baffles and extending from axially above to below said outer baffle, each of said baffles having a plurality of cutouts in the edges thereof, said intermediate, outer, and stationary baffles having a plurality of small openings throughout the surfaces thereof, said baffles cooperating with said feed mechanism to create a complex of irregular eddy currents which force the wheat particles between said baffles causing separation of the endosperm into granular particles without any substantial heating or compaction thereof.

6. Four milling apparatus for producing flour from wheat comprising, a separator mechanism including a first disk mounted for rotation about an axis, a second disk mounted on said axis and spaced from said first disk a predetermined distance, said disks having an abrasive surface on adjacent sides thereof near the outer peripheries thereof, said surfaces being spaced apart a predetermined distance less than the thickness of the wheat kernels, means for rotating said disks with respect to each other so that when the wheat kernels are forced between said surfaces the bran is stripped cleanly from the wheat kernels, said separating mechanism including a plurality of cooperating annular baffle means on the outer periphery of said disks for rotation therewith to create a complex of irregular eddy currents which force the wheat particles against said baffle means causing separation of the endosperm into granular particles without any substantial heating or compaction thereof.

7. Flour milling apparatus for producing wheat from flour comprising, feed and separator mechanisms, said feed mechanism having a mixing chamber for mixing a predetermined amount of excess air with said wheat is said chamber, said separating mechanism including a first disk mounted for rotation about a first axis, a second disk mounted on said axis and spaced from said first disk a predetermined distance, said disks having abrasive surfaces on adjacent sides thereof near the outer peripheries thereof, said surfaces being spaced apart a predetermined distance less than the thickness of the wheat particles being processed thereby, means for rotating said disks relative to one another so that when the wheat particles are forced therebetween they are reduced in size, said separating mechanism including a series of cooperating annular baffle means on the outer periphery of said disks for rotation therewith and for cooperation with said feed mechanism to create a complex of irregular eddy currents which force the wheat particles between said baffle means causing separation of the endosperm into granular particles without any substantial heating or compaction thereof.

8. Flour milling apparatus for producing flour from wheat comprising a housing, feed and separator mechanisms, said feed mechanism including a mixing chamber, means for regulating a rate of flow of wheat into said mixing chamber, means for mixing a predetermined amount of excess air with said wheat in said chamber, an impeller for drawing air into said chamber, first drive means for rotating said impeller, said separating mechanism including a first disk mounted for rotation with said impeller, a second disk mounted coaxially with said first disk and spaced therefrom a predetermined distance, second drive means for rotating said second disk, said disks having an abrasive means thereon spaced apart a predetermined distance less than the thickness of the wheat particles being processed thereby, said first and second drive means adapted to rotate said disks at different relative velocities so that when the wheat particles are forced between said surfaces the bran is stripped cleanly therefrom and the particles are reduced in size without any substantial heating or compaction thereof, adjusting means for changing the distance between said surfaces, said separating mechanism including a plurality of interleaved baffle members for rotation therewith, and a stationary annular baffle member on said housing concentric with said other baffle members and extending from axially above to below said other baffle members, said baffle members co-operating with said feed mechanism to create a complex of irregular eddy currents which force the wheat particles between and against said baffle members causing separation of the endosperm into granular flow particles without any substantial heating or compaction thereof.

9. Flour milling apparatus for producing flour from wheat comprising, a housing, feed and separator mechanisms in said housing, said feed mechanism including a mixing chamber, means for regulating a rate of flow of wheat into said mixing chamber, means for mixing a predetermined amount of excess air with wheat in said chamber, an impeller for drawing air into said chamber, first drive means for rotating said impeller, said separating mechanism including a first disk mounted for rotation with said impeller, a second disk mounted coaxially with said first disk and spaced therefrom a predetermined distance, second drive means for rotating said second disk, said first and second drive means adapted to rotate said disks at different relative angular velocities, said separating mechanism including a plurality of interleaved annular baffle members on the outer periphery of said disks for rotation therewith, and a stationary annular baffle member on said housing concentric with said interleaved baffle members and extending axially above to below said interleaved baffle members, said interleaved and stationary baffle members cooperating with said feed mechanism to create a complex of irregular eddy currents which force the wheat particles between said baffle members causing separation of the endosperm into granular flour particles without any substantial heating or compaction thereof.

10. Milling apparatus for producing granular particles from granular material comprising, a separator mechanism including a first disk mounted for rotation about an axis, a second disk mounted on said axis and spaced from said first disk a predetermined distance, said disks having abrasive surfaces on adjacent sides thereof near the outer peripheries thereof, said surfaces being spaced apart a predetermined distance less than the thickness of the granular material, means for rotating said disks with respect to each other so that when the granular material is forced between said surfaces the granular material is reduced in size, said separating mechanism including a plurality of cooperating annular baffle means on the outer periphery of said disks for rotation therewith to create a complex of irregular eddy currents which force the granular material against said baffle means causing separation into smaller granular particles without any substantial heating or compaction thereof.

11. Milling apparatus for producing granular particles from larger granular material comprising, feed and separator mechanisms, said feed mechanism including a mixing chamber, means for regulating a rate of flow of wheat into said mixing chamber, air control means for admitting into said mixing chamber a preset uniform volume of air in excess of the air usually present between the individual grains of the material, means for uniformly mixing said preset volume of excess air with the material, said separating mechanism including a first disk mounted for rotation with respect to said feed mechanism, a second disk mounted coaxially with said first disk, said disks having an abrasive means thereon spaced apart a preset distance less than the thickness of the grains of material being processed thereby, impeller means for forcing the mixture of excess air and material between said disks, and drive means for effecting relative rotation of said disks so that when the grains of material are forced between said disks they are reduced in size without any substantial heating or compaction thereof.

12. Flour milling apparatus for producing flour from wheat comprising, feed and separator mechanisms, said feed mechanism including a mixing chamber, means defining an inlet passage to said mixing chamber, regulating means for controlling a rate of flow of wheat through said inlet passage into said mixing chamber, air control means for admitting a preset uniform volume of excess air into said mixing chamber to be mixed uniformly with the wheat in said chamber, said separating mechanism including a first disk mounted for rotation, a second disk mounted coaxially with said first disk and spaced therefrom, said disks having an abrasive means thereon and being spaced apart a predetermined distance less than the thickness of the wheat particles being processed thereby, impeller means for forcing the mixture of excess air and wheat between said disks, and drive means for effecting relative rotation between said disks so that when the wheat particles are forced between said disks the bran is stripped therefrom and the particles are reduced in size without any substantial heating or compaction of the wheat particles.

13. Apparatus as provided in claim 11 wherein adjusting means are provided for changing the distance between said disks to adapt such apparatus for particles of different sizes.

References Cited by the Examiner

UNITED STATES PATENTS

| | | | |
|---|---|---|---|
| 592,774 | 11/1897 | Fraizer | 222—286 |
| 750,895 | 2/1904 | Robinson | 241—248 |
| 1,424,608 | 8/1922 | Woolcott | 241—12 |
| 1,523,478 | 1/1925 | Fischer | 241—248 X |
| 1,985,606 | 12/1934 | Herrmann | 241—248 |
| 2,100,691 | 11/1937 | Foster | 241—12 |
| 2,692,702 | 10/1954 | Church | 222—285 X |
| 3,038,673 | 6/1962 | Fisher | 241—251 X |

LESTER M. SWINGLE, *Primary Examiner.*

J. SPENCER OVERHOLSER, ROBERT C. RIORDON, *Examiners.*

WILLIE G. ABERCROMBIE, *Assistant Examiner.*